(12) United States Patent
Goeschel et al.

(10) Patent No.: US 11,142,471 B2
(45) Date of Patent: Oct. 12, 2021

(54) WATER SYSTEM FLOOR INTERFACE WITH ULTRAVIOLET LIGHT TREATMENT

(71) Applicant: MAG Aerospace Industries, LLC, Carson, CA (US)

(72) Inventors: Christoph Goeschel, Seattle, WA (US); Razmik B. Boodaghians, Glendale, CA (US); Cynthia L. Chapman, Seattle, WA (US)

(73) Assignee: MAG Aerospace Industries, LLC, Carson, CA (US)

( * ) Notice: Subject to any disclaimer, the term of this patent is extended or adjusted under 35 U.S.C. 154(b) by 45 days.

(21) Appl. No.: 16/542,879

(22) Filed: Aug. 16, 2019

(65) Prior Publication Data

US 2020/0055749 A1    Feb. 20, 2020

Related U.S. Application Data

(60) Provisional application No. 62/719,457, filed on Aug. 17, 2018.

(51) Int. Cl.
  *C02F 1/32* (2006.01)
  *B64D 11/00* (2006.01)
  *B64D 11/02* (2006.01)

(52) U.S. Cl.
  CPC .......... *C02F 1/325* (2013.01); *B64D 11/0007* (2013.01); *B64D 11/02* (2013.01); *C02F 2201/001* (2013.01); *C02F 2201/3222* (2013.01); *C02F 2303/04* (2013.01)

(58) Field of Classification Search
  None
  See application file for complete search history.

(56) References Cited

U.S. PATENT DOCUMENTS

| 4,798,702 A * | 1/1989 | Tucker ...................... A61L 2/10 210/748.11 |
| 5,692,542 A * | 12/1997 | Smith ...................... F16L 55/11 138/89 |
| 6,372,132 B1 * | 4/2002 | Williams ................ C02F 1/003 210/232 |
| 6,946,651 B1 | 9/2005 | Bohne |
| 7,666,317 B2 | 2/2010 | Hsueh et al. |
| 9,061,923 B2 | 6/2015 | Hsueh et al. |
| 9,260,323 B2 | 2/2016 | Boodaghians et al. |
| 9,376,333 B2 | 6/2016 | Boodaghians et al. |

(Continued)

FOREIGN PATENT DOCUMENTS

| CA | 2755532 | 5/2012 |
| CN | 202175579 U * | 3/2012 |

(Continued)

OTHER PUBLICATIONS

International Patent Application No. PCT/US2019/046848, International Search Report and Written Opinion, dated Oct. 23, 2019.

*Primary Examiner* — Michael J Logie (74) *Attorney, Agent, or Firm* — Kilpatrick Townsend & Stockton LLP (57) ABSTRACT

An ultraviolet (UV) light disinfection system for treating water prior to its delivery to a water usage device. One or more UV light emitting diodes (LEDs) are positioned within a water system floor interface in order to expose water flowing through the system to germicidal light treatment.

12 Claims, 7 Drawing Sheets

(56) References Cited

U.S. PATENT DOCUMENTS

| | | | |
|---|---|---|---|
| 10,266,426 B1 | 4/2019 | Conrad et al. | |
| 2003/0143880 A1* | 7/2003 | Bousquet | H02G 3/185 |
| | | | 439/135 |
| 2006/0169649 A1* | 8/2006 | Hsueh | B08B 9/0321 |
| | | | 210/764 |
| 2010/0072198 A1* | 3/2010 | Roemer | H02G 3/185 |
| | | | 220/3.3 |
| 2010/0133155 A1* | 6/2010 | Nolan | B01D 35/157 |
| | | | 210/98 |
| 2012/0011874 A1* | 1/2012 | Conradt | C02F 1/325 |
| | | | 62/264 |
| 2015/0129776 A1* | 5/2015 | Boodaghians | C02F 1/325 |
| | | | 250/432 R |
| 2016/0009570 A1 | 1/2016 | Yu et al. | |
| 2016/0074546 A1* | 3/2016 | Rizzone | A61L 2/26 |
| | | | 250/455.11 |
| 2019/0060496 A1* | 2/2019 | Tillotson | A61L 2/10 |
| 2021/0163316 A1* | 6/2021 | Choi | A61L 9/20 |

FOREIGN PATENT DOCUMENTS

| | | | | |
|---|---|---|---|---|
| GB | 2500664 A | | 10/2013 | |
| GB | 2548379 A | | 9/2017 | |
| JP | 2003310742 A | * | 11/2003 | ............... A61L 9/20 |
| JP | 2015230885 A | * | 12/2015 | ............... F21V 19/00 |
| KR | 1017955080000 | | 11/2017 | |

\* cited by examiner

WATER SYSTEM FLOOR INTERFACE WITH ULTRAVIOLET LIGHT TREATMENT

This application claims the benefit of U.S. Provisional Application Ser. No. 62/719,457, filed Aug. 17, 2018 titled "Potable Water System Floor Interface with UV," the entire contents of which are hereby incorporated by reference.

FIELD OF THE DISCLOSURE

Embodiments of the present disclosure relate generally to an ultraviolet (UV) light disinfection system for treating water prior to its delivery to a water usage device. One or more UV light emitting diodes (LEDs) are positioned within a water system floor interface in order to expose water flowing through the system to germicidal light treatment.

BACKGROUND

Disinfection of water on-board passenger transportation vehicles is necessary to guarantee water quality. This may include disinfection of potable water that is held in a self-contained potable water tank onboard the vehicle. The water held in the tank is ultimately intended for delivery to beverage makers, sinks for hand-washing, toilets for flushing, other water usage devices, or is otherwise routed on-board the vehicle for various forms of water use or consumption, such as humidifier, sprinkler system, and so forth. As one example, water systems on aircraft are complicated systems that usually include a tank with plumbing conduits and a pressurization system to deliver water to the various points of use.

The issue of water quality, and in particular, of potable water quality, on passenger transportation vehicles and equipment, such as aircraft, trains, boats and ships, and the like is a point of interest for regulatory authorities. Regulatory standards have been enacted that require water carried on-board passenger vehicles to meet certain standards such as the US EPA Aircraft Drinking Water Rule. Passenger airlines and other transportation companies must thus meet relevant drinking water standard(s). If failing to do so, the aircraft water system has to go through disinfection process per specified protocol and retested, accordingly. This can lead to the aircraft being grounded until retesting of water quality and confirmation that the water management system is free of any microbial contamination.

Airlines and other passenger transport vehicle companies must thus ensure that the potable water (i.e., drinkable water) carried aboard the aircraft is fit for human consumption by employing appropriate disinfection protocols and by preventing cross-contamination during water upload. However, disinfection upon upload and periodic disinfection sampling does not always adequately address the issue of contamination that may occur in the water tank and/or when the water is leaving the tank for use on board the aircraft. For example, air must periodically be introduced into the water storage and dispensing system on the aircraft in order to maintain pressurization, as well as to drain the system during routine servicing. This air can introduce airborne pathogens or bacteria that can multiply and cause unsanitary conditions and unacceptable water quality in the intervals between samplings or disinfection procedures. In effect, because the water storage and dispensing system is routinely exposed to the outside environment, potable water quality inside the water holding tank cannot always be ensured without some form of additional treatment. Additionally, water storage tanks are often drained at the end of the flight in order to prevent water freezing or other bacterial buildup. Because the internal surface of the water supply tank is then subjected to moist air for (potentially) many hours until the surface dries, this can also be a breeding ground for microorganisms or other biofilms.

Specifically, microorganisms and biofilms may contaminate water held in a self-contained potable water supply, such as water tanks located onboard passenger transportation vehicles. Accumulation may occur along the interior surfaces of the water tank and/or water distribution lines. It is also possible for bacteria, viruses, spores, mold, algae, or other microorganisms to grow in a water holding tank and/or water distribution lines.

The present assignee owns pending applications and issued patents that are directed to water treatment upon upload (U.S. Pat. No. 9,061,923), chemical water treatment (U.S. Pat. No. 7,666,317), water treatment within the water tank (U.S. Pat. No. 10,266,426), water treatment along or in-line with water distribution lines (U.S. Pat. No. 9,376,333), as well as water treatment at the point of use (U.S. Pat. No. 9,260,323), (e.g., water treatment systems mounted within lavatory cabinets), as well as others. These technology systems may be used to treat and disinfect water that is held in the water tank on an on-going basis, as well as to treat water upon upload or upon its delivery to its point of use. The present invention disclosure is distinct from these earlier water treatment systems because it focuses on providing a space efficient device, which is critical in an aircraft space allocation for equipment. The disclosed water system floor interface is designed to be positioned and function within/below a floor interface, which is considered a "dead space." The disclosure offers significant value to the water system architecture by not being positioned inside the lavatory and/or galley monuments.

BRIEF SUMMARY

Embodiments described herein thus provide systems and methods for treating and disinfecting water contained in a potable water tank. These systems generally use one or more UV LEDs that are positioned within a floor interface and that are configured to emit UV light/irradiation into the water flowing therethrough.

There is thus provided a water system floor interface for a vehicle, comprising: a floor mount component; a UV interface component comprising an interior space housing a UV unit and a water line comprising one or more revolutions and being of a UV transparent material, wherein the one or more revolutions of the water line revolve around the UV unit. There may be one or more UV LEDs or UV OLEDs positioned within the UV unit. The water line may have a first end for receiving water from an onboard water tank and a second end for delivering treated water to a water usage device. The floor mount component may define a cavity that is shaped and configured to receive the UV interface component.

In some examples, the floor mount component has an outer flange configured to abut a floor surface. The floor surface may be a lavatory floor, a galley floor, or a floor panel. The UV interface component may have an electrical interface that, in some examples, is positioned on an upper surface of the UV interface component. In other examples, the electrical interface may be positioned on a lower surface of the UV interface component. The UV interface component may also have a potable water interface that is configured to cooperate with a water distribution line that delivers water to a water usage device. The UV interface component may also feature a water shut off feature or a cover.

It is possible to provide set of arrows that indicate when the UV interface component and the floor mount component are properly aligned. Additionally or alternatively, the UV interface component may be angularly adjusted within the floor mount component in order to adjust to varied onboard plumbing configurations.

DETAILED DESCRIPTION

Chlorination or other chemical treatment is not always effective in reducing or removing bacteria lying beneath a protective biofilm. On the other hand, ultraviolet (UV) light treatment can eliminate bacteria, viruses, spores, and mold in the water. It can purify water by making biological impurities inactive. Ultraviolet lamps are generally designed to destroy the links in these micro-organisms' DNA so that they are de-activated and cannot reproduce. The crucial hydrogen bonds that link the DNA chain together rupture when exposed to light between the wavelengths of about 220 nm to about 310 nm. In a particular example, the range may be from about 250-270 nm. In an even more particular example, there may be a single mono wavelength of 254 nm.

There are a number of water treatment solutions being employed and/or studied for use on-board aircraft. Delivery of an ultraviolet (UV) light to the water in the system has been found beneficial because the treatment does not change the taste or odor of the water, it kills bacteria, viruses and protozoan, it is compact and easy to use, and it can prevent biofilm if the system is kept clean. One specific method of water treatment that has been explored is the use of ultraviolet light emitting diode (UV LED) light for water treatment. The use of UV LED light can use a wide UV band with multiple LED wavelengths, and can offer a high power output with less power consumption than traditional UV lamps. UV LEDs have greater longevity, power up quickly without requiring a delay time built into the system for the UV light source to reach its optimum UV energy output, and do not contain mercury.

These UV LED sources have been used at the point of use and along water lines (e.g., for in-line water treatment). It is not believed, however, that any type of UV light source has been installed at a floor interface for treating water as it is delivered from a water distribution line to a water usage device, such as a sink faucet, toilet, coffee maker connection, or any other water usage device that pulls water from an on-board water tank. The present inventors have determined that it is desirable to provide a system that can be installed within the floor of the aircraft, such that a lower surface connects with water distribution lines and an upper surface connects with a water delivery line that directs water toward a water usage device.

Figure 1:
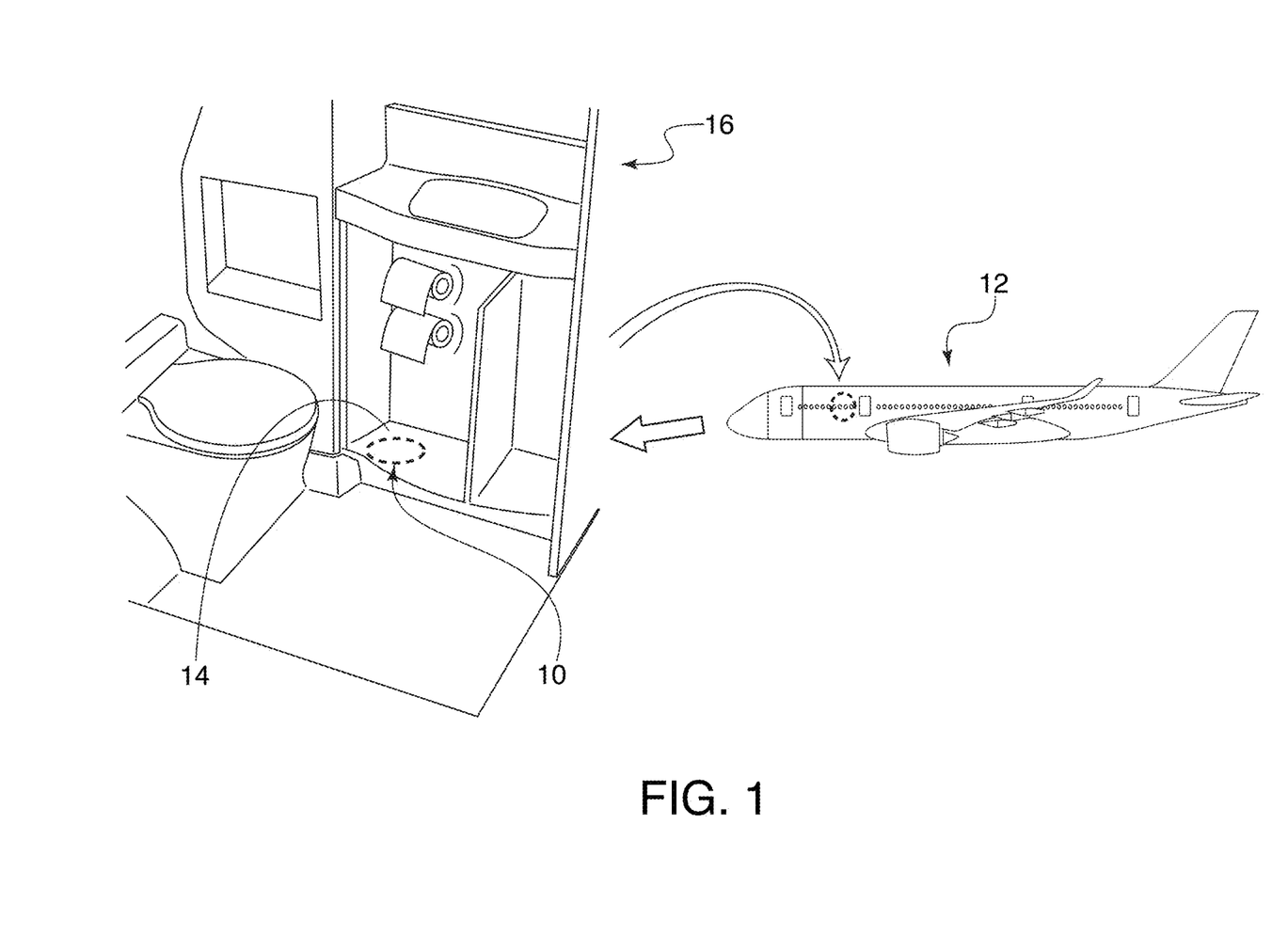
FIG. 1 shows a schematic illustration of a potential location for a water system floor interface onboard a vehicle such as an aircraft.

As illustrated by FIG. 1, the disclosed water system floor interface 10 is configured for use onboard a passenger transportation vehicle 12. It is particularly designed for use onboard a passenger aircraft, but it should be understood that the embodiments provided by this disclosure may be used on any other type of vehicle, such as marine craft, recreation vehicles, trains or buses, or any other passenger transportation vehicle on which purified and/or treated water is delivered to one or more water usage devices. FIG. 1 illustrates the water system floor interface 10 positioned within a floor surface 14 of an aircraft lavatory 16. The floor surface 14 may be the lavatory floor, a galley floor, or a floor panel.

Figure 2A:
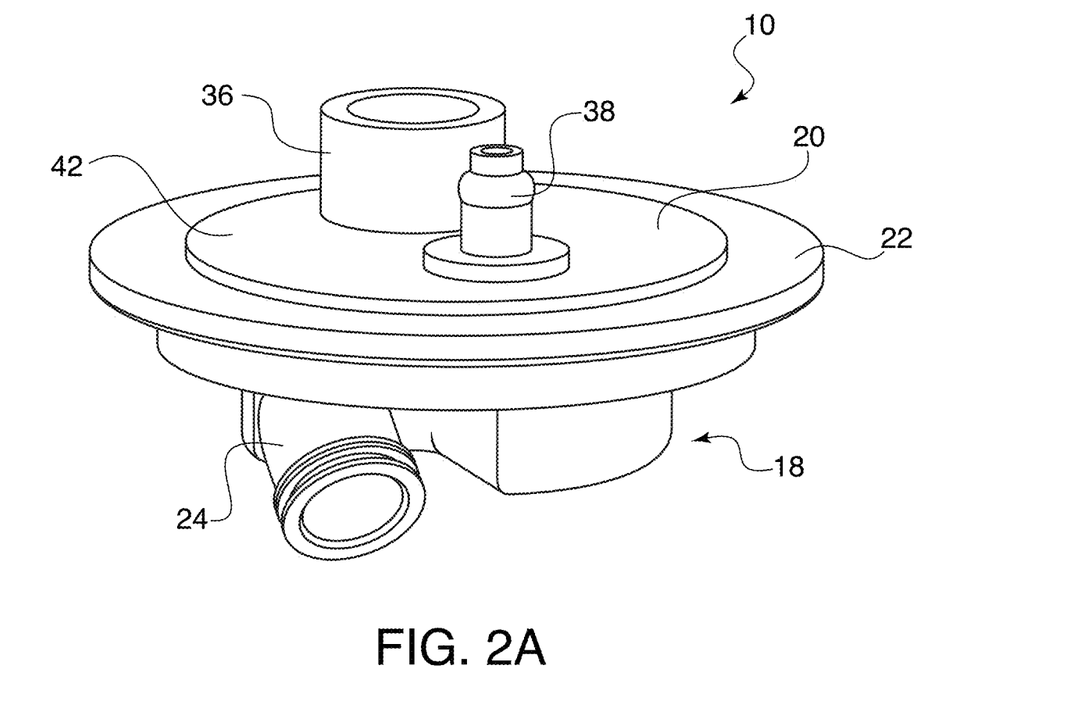
FIG. 2A illustrates a perspective view of a water system floor interface.
Figure 2B:
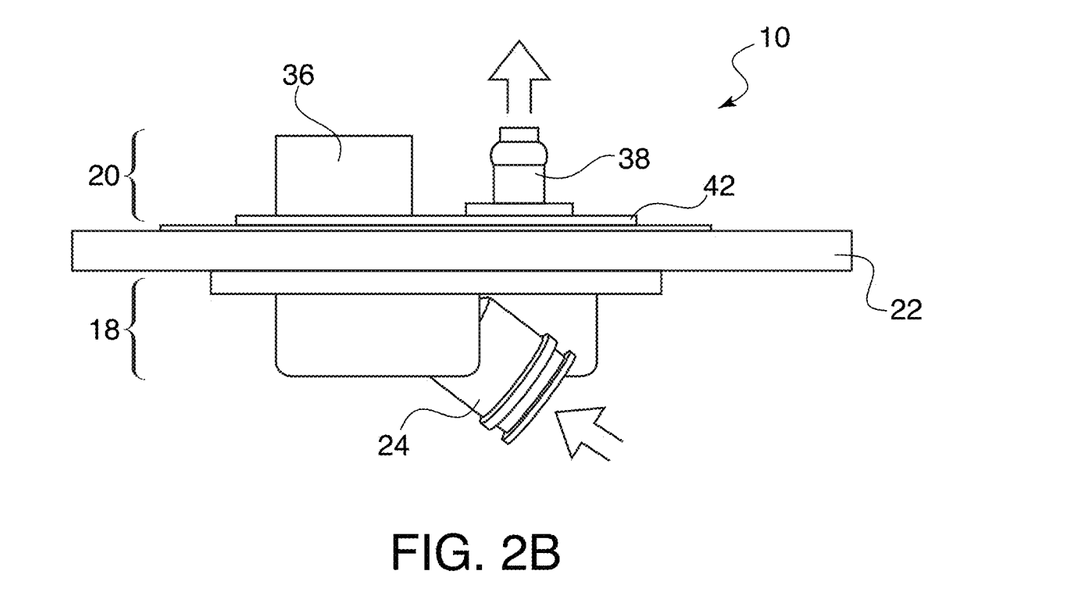
FIG. 2B illustrates a side plan view of the water system floor interface of FIG. 2A.
Figure 3:
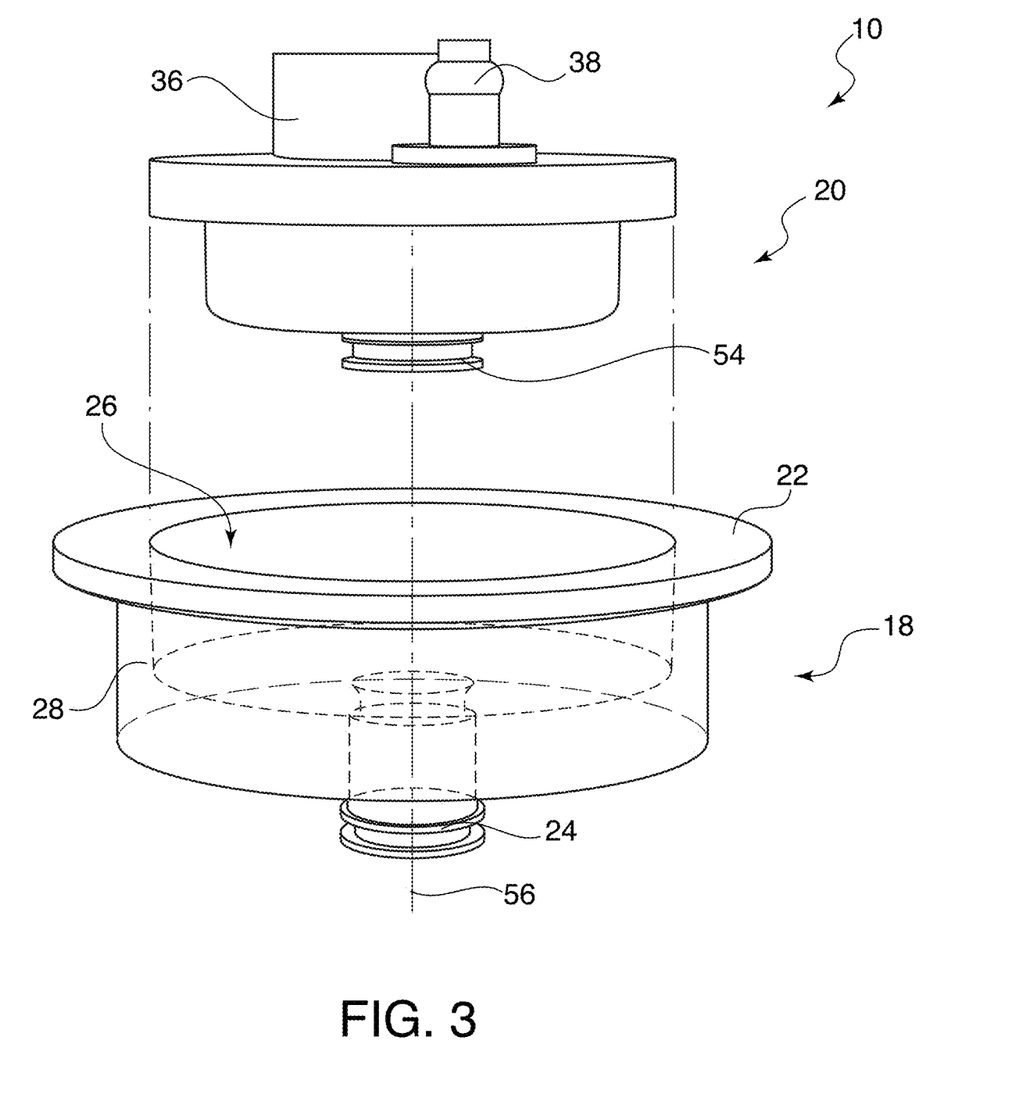
FIG. 3 illustrates an exploded view of a water system floor interface, showing a UV interface component and a floor mount component.

FIG. 2A illustrates a side perspective view of the water system floor interface 10. FIG. 2B illustrates a side plan view, showing direction in which water enters and exits the water system floor interface 10. FIG. 3 illustrates a side plan exploded view of a water system floor interface 10. In these figures, there is shown a—floor mount component 18, which may function as a frame unit. Also shown is a UV interface unit 20. In these examples, the UV interface unit 20 is nested or otherwise mounted within the—floor mount component 18 to collectively form the floor interface 10. Specifically, an outer flange 22 may be present on the mount component 18. When the water system floor interface 10 is positioned within a floor, the outer flange 22 is generally flush with the floor surface 14. (It may be slightly above the floor surface or slightly below the floor surface, depending upon the mounting hole size, seal size, and other factors.)

The mount component 18 also features a water system plumbing interface 24 along a lower portion. This interface 24 cooperates with water distribution lines leading to and from a main water source, such as a potable water tank (not shown). The water system interface plumbing 24 may be angled to the side (as illustrated by FIGS. 2A and 2B) or it may be directed straight down, such that its central axis is perpendicular to the floor surface (as illustrated by FIG. 3). This orientation may depend upon the configuration of the vehicles water distribution lines.

FIG. 3 illustrates a UV interface component to mount component interface 54. This interface 54 allows the UV interface component 20 and the mount component 18 to be aligned at a water entry inlet 56. This can define a self-sealing interface between the UV interface component 20 and the mount component 18. FIG. 3 also illustrates that the mount component 18 defines a cavity 26 into which the UV interface unit 20 may be positioned upon installation and use. The cavity 26 of the mount component 18 is defined by sidewalls 28. Sidewalls 28 are illustrated as generally perpendicular to the outer flange 22, but it should be understood that they may be inwardly or outwardly tapered if necessary to ease cooperation between the mount component 18 and the UV interface component 20.

Figure 4:
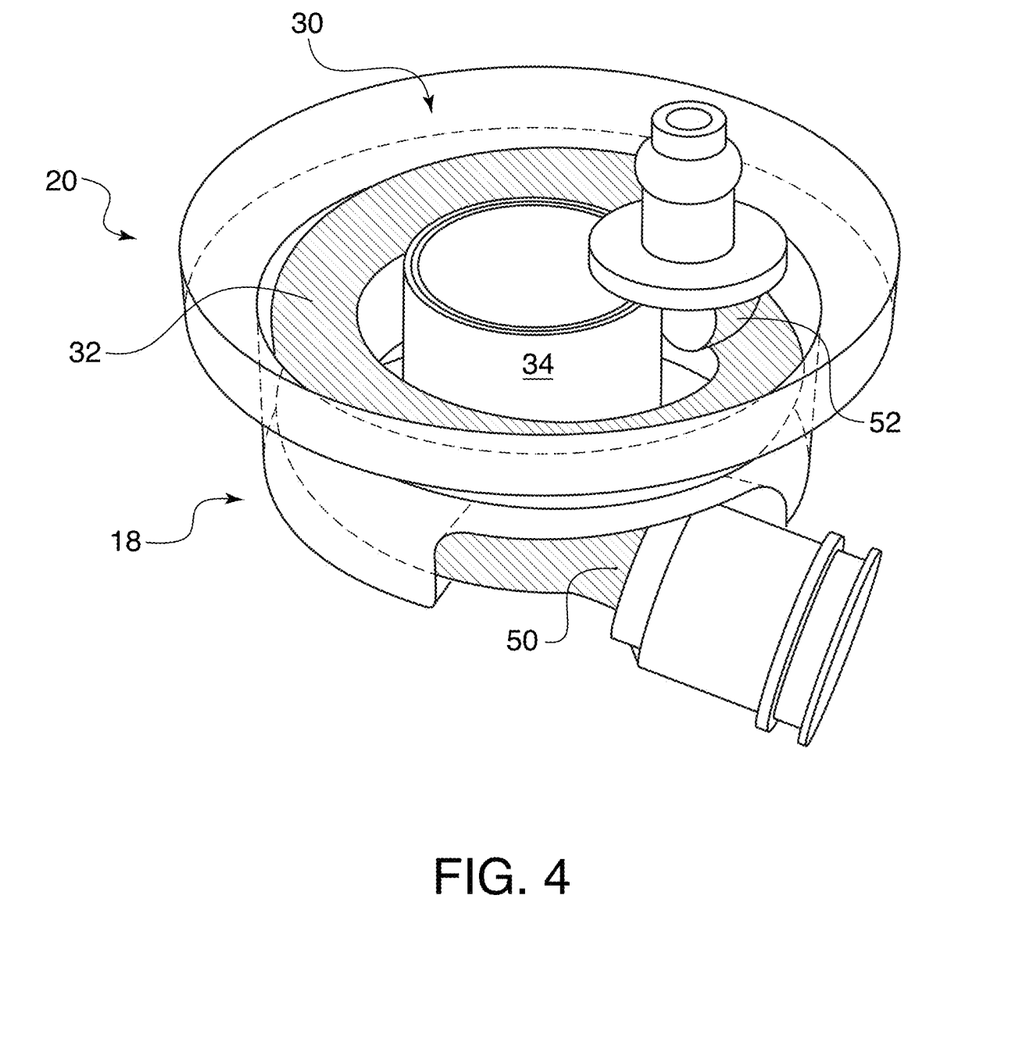
FIG. 4 illustrates a perspective view of a UV interface component mounted within a mount component.

FIGS. 2A, 2B, and 4 show the UV interface component 20 mounted within the mount component 18. Once the mount component 18 is installed with respect to the floor surface 14 (which may be a lavatory floor, a galley floor, or a floor panel), the UV interface component 20 can be positioned within the mount component cavity 26. This allows the system 10 to be installable and maintainable from above the floor or floor panel. By positioning the system at the floor surface 14, space within a lavatory or galley cabinet is not used. This also allows the connection to occur directly at the point at which a water distribution line would access the lavatory or galley space. The water system floor interface 10 houses one or more UV LEDs for water disinfection.

Figure 5:
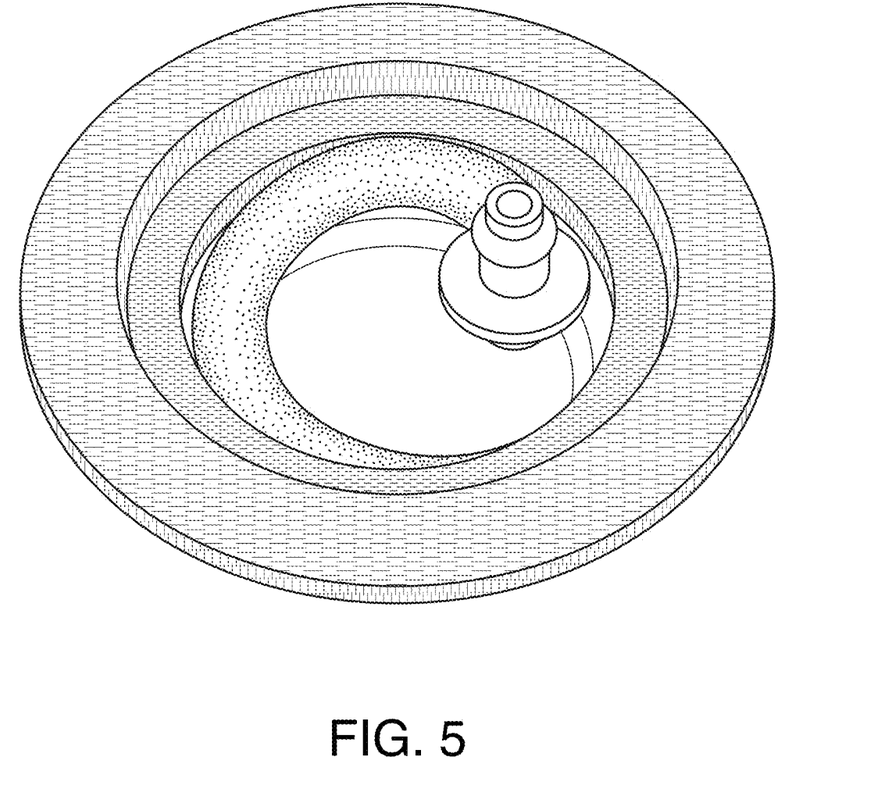
FIG. 5 shows a top perspective view of a UV interface component.
Figure 6:
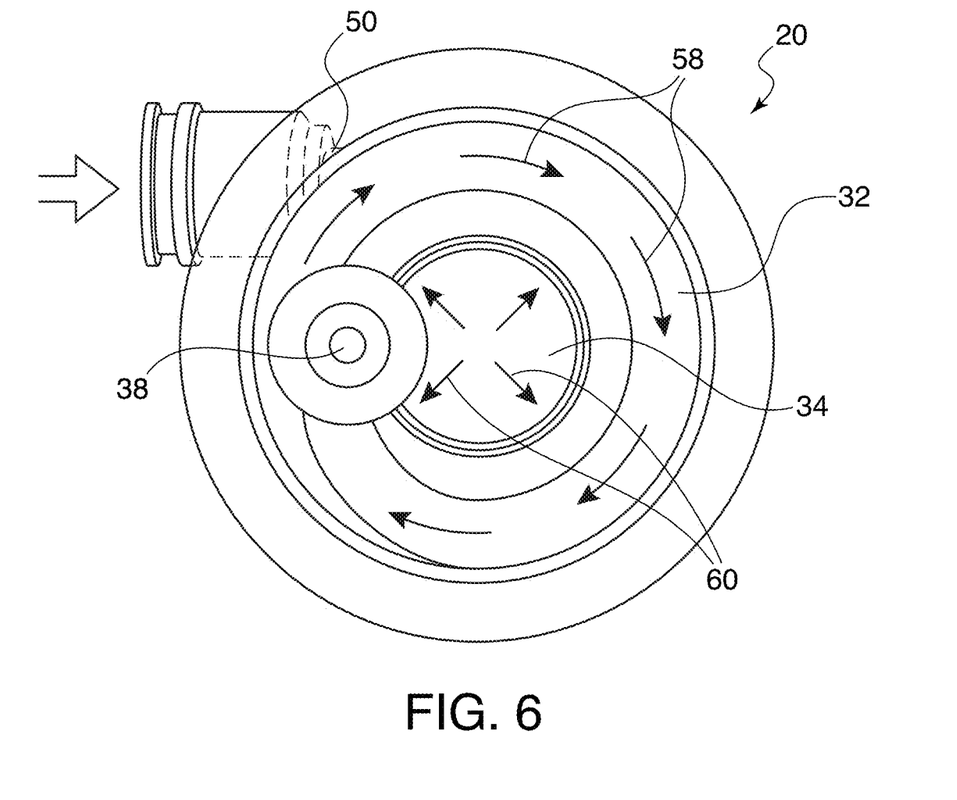
FIG. 6 shows a top plan view of the UV interface component of FIG. 5.

Reference will now be made to the features of the UV interface component 20, examples of which are illustrated by FIGS. 4-6. The UV interface component 20 defines an interior space 30 that supports a water line 32. In one example, water line 32 makes at least one revolution (the number of revolutions may be defined as n+1). It is possible for water line 32 to make less than a complete revolution. It is also possible for water line 32 to make multiple revolutions, such that it resembles a coiled hose. The number of revolutions of the water line 32 may be based on the amount of water to be treated, the available pressure to be applied to the water, or other factors. If provided, multiple revolutions or loops are provided in order to increase the treatment exposure of the water supply contained within the water line 32. The water line 32 may be a quartz, plastic, or polymeric tube or conduit that allows light at UV wavelengths to pass therethrough. The water line 32 may have a protective coating that allows penetration of UV light but that also prevents buildup of bacteria or other microorganisms. The water line 32 may be integrated into the outer flange and seals against a cylindrical UV component in the center as part of the UV interface component 20.

The water line 32 may be provided with a first end 50 that is configured to cooperate with a first water line fitting and that functions as an inlet to the water line. The water line 32 may also be provided with a second end 52 that is configured to cooperate with a second water line fitting and that function as an outlet to the water line 32.

As the water enters the water line 32 and moves through the water line 32 (e.g., as it moves through the one or more revolutions due to pressure), it is treated with UV light. A UV unit 34 is positioned in a central area of the interior space 30. The UV unit 34 may support one or more UV LEDs. The UV unit 34 may support one or more UV OLEDs (organic light emitting diodes), which are more malleable and shapeable than traditional UV LEDs. Either option or any combination thereof may be used in accordance with this disclosure.

The UV interface component 20 may also have an electrical interface 36. FIGS. 2A, 2B and 3 illustrate electrical interface 36 as being positioned on the surface of the component 20 that extends above the floor surface. (It should be understood, however, that is also possible for the electrical interface 36 to be positioned below the floor surface 14 if the aircraft architecture lends itself to such an electrical connection. For example, this is the case with the embodiment illustrated by FIG. 7, which does not show an electrical interface extending from the top surface.)

The UV interface component 20 is also provided with a potable water interface 38. This interface 38 generally extends above the floor surface 14 in all embodiments. The potable water interface 38 is in fluid communication with the second end 52 of the water line 32. The potable water interface 38 is configured to cooperate with one or more water distribution lines that lead directly to a water usage device.

Figure 7:
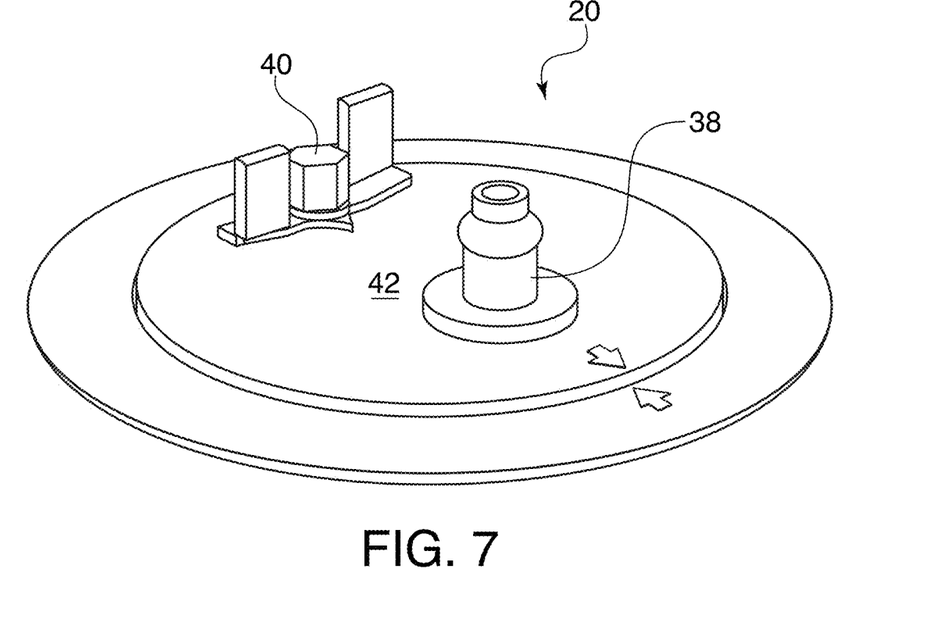
FIG. 7 shows a top perspective view of a UV interface component with a water shut off feature.

The UV interface component 20 may be provided with a water shut off feature 40, as illustrated by FIG. 7. This water shut off feature 40 may be used in the event of a water line break or other water breach in order to prevent flooding above the floor surface 14.

The figures also illustrate a cover 42 that may be positioned over the cavity 30 that houses the water line 32. Cover 42 is positioned to prevent tampering with the system 10, as well as to protect passengers and crew from the UV light being emitted within the system.

FIG. 7 also illustrates a set of optional arrows that may be used to ensure that the UV interface component 20 and floor mount component 18 are mounted properly with respect to one another. As shown, one of the arrows may be positioned on the UV interface component 20 and one of the arrows may be positioned on the floor mount component 18. When the two components 18, 20 are properly aligned, the arrows will align. If the components are not engaged or clocked properly, the arrows will not align. This can provide a safety feature, ensuring that the components 18, 20 are mechanically clocked properly so that the UV light connection is securely made. If the arrows are not aligned, this is an indication that the connection is not secure/properly assembled and the UV light will not be activated or otherwise emit light. This safety default will prevent light from escaping if the connection is not secure, protecting any passengers or crew from UV light exposure.

Figure 8:
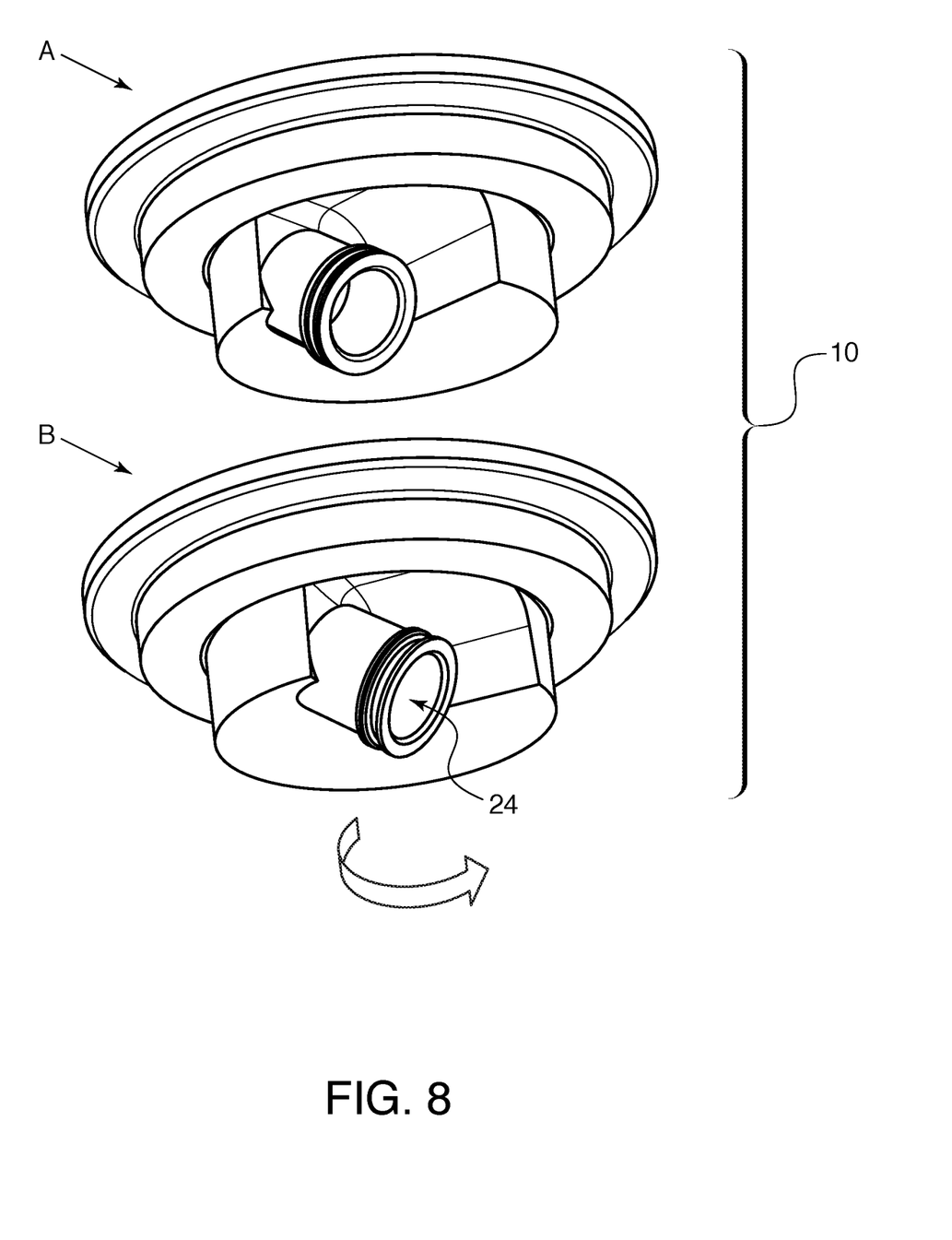
FIG. 8 illustrates an exploded view of a water system floor interface, showing how a UV interface component can be clocked in various positions within a floor mount component.

FIG. 8 illustrates an alternate example of an embodiment that can ensure that the UV interface component and floor mount component of the system 10 are mounted properly and clocked with respect to one another. This can help improve alignment with the below floor plumbing. For example, as shown, if the interface 24 should be positioned at a varied angle based on the incoming angle of a water line from the main water tank, it is possible for the UV interface component 20 to be adjusted from position "A" to position "B" within the frame as shown. In other words, the UV interface component 20 can be installed at various angles with respect to the frame of the floor mount component 18. These various angles can also be modified to correspond to any type of above floor plumbing layout as well. The UV interface component may be angularly adjusted within the floor mount component in order to adjust to varied onboard plumbing configurations.

The primary features of the mount component 18 and the UV interface component 20 may be made of a composite or injection molded plastic. Other materials are possible and considered within the scope of this disclosure as well, including but not limited to steel, aluminum, titanium, poly carbonate, or any other appropriate materials suitable for aerospace engineering.

The UV LEDs or UV OLEDs described herein emit ultraviolet light having a wavelength that will disrupt bacteria in order to disinfect the water being treated. In a specific example, the wavelength of the light emitted may be between about 220 nm to about 310 nm. In a particular embodiment, the wavelength of the light emitted may be between about 250-270 nm. In an even more particular embodiment, the wavelength of the light emitted may be a single mono wavelength of 254 nm.

When UV energy is absorbed by the reproductive mechanisms of bacteria and viruses, the genetic material (DNA/RNA) is rearranged so that they can no longer reproduce, killing the bacteria and eliminating the risk of disease. UV treatment thus disinfects water without adding disinfection chemicals.

The UV LEDs described herein are mounted or otherwise positioned so that they can emit light directly into water line 32. In use, UV rays are admitted and absorbed into the water stream. In one example illustrated by FIG. 6, water flow follows arrows 58 and UV light energy follows arrows 60.

By providing water treatment at the floor surface level, the water system floor interface 10 disclosed helps save valuable space onboard a vehicle. Additionally, repair and replacement of the UV interface component 20 is rendered easier as it is accessible from above the floor and does not require any removal of below floor plumbing components.

The above disclosure provides examples of the features sought to be protected by the below claims. It should be understood that changes and modifications, additions and deletions may be made to the structures and methods recited above and shown in the drawings without departing from the scope or spirit of the disclosure or the following claims.

What is claimed is:

1. A water system floor interface for a vehicle, comprising:
   (a) a floor mount component that functions as a frame unit configured to be mounted flush with a floor surface, the floor mount component comprising (i) a mount component cavity, (ii) an outer flange, and (iii) a water system plumbing interface;
   (b) a UV interface component comprising (i) an external shape configured to be received by and nested within the floor mount component cavity, (ii) an interior space housing a UV unit comprising one or more UV LEDs, (iii) a water line comprising one or more revolutions and being of a UV transparent material, wherein the one or more revolutions of the water line revolve around the UV unit, (iv) a mount component interface that cooperates with the water system plumbing interface and that aligns the UV interface component with the floor mount component, and (v) a potable water interface configured to cooperate with a water distribution line that delivers treated water exiting the water system to a water usage device, and
   (c) a cover configured to be positioned over the interior space that houses the water line, wherein in use, the floor mount component is mounted with the outer flange generally flush with the floor surface, the water system plumbing interface cooperates with water distribution lines leading to and from an on-board potable water tank, the UV interface component is nested within the floor mount component, the cover is positioned over the UV interface component such that the potable water interface extends above the cover and above the floor surface, and the potable water interface cooperates with one or more water lines that lead to a water usage device.

2. The system of claim 1, wherein one or more UV LEDs are UV OLEDs.

3. The system of claim 1, wherein the water line comprises a first end for receiving water from an onboard water tank and a second end for delivering treated water to a water usage device.

4. The system of claim 1, wherein the floor surface comprises a lavatory floor, a galley floor, or a floor panel.

5. The system of claim 1, wherein the UV interface component comprises an electrical interface.

6. The system of claim 5, wherein the electrical interface is positioned on an upper surface of the UV interface component.

7. The system of claim 5, wherein the electrical interface is positioned on a lower surface of the UV interface component.

8. The system of claim 1, wherein the UV interface component comprises a potable water interface configured to cooperate with a water distribution line that delivers water to a water usage device.

9. The system of claim 1, wherein the UV interface component comprises a water shut off feature.

10. The system of claim 1, further comprising a cover.

11. The system of claim 1, further comprising a first arrow on the UV interface component and a second arrow on the floor mount component that align with one another when the UV interface component and the floor mount component are properly aligned.

12. The system of claim 1, wherein the UV interface component may be angularly adjusted within the floor mount component in order to adjust to varied onboard plumbing configurations.

* * * * *